United States Patent [19]

Moe

[11] 4,062,410

[45] Dec. 13, 1977

[54] ADJUSTABLE MOLDBOARD FOR VARIABLE SPEED PLOWING

[75] Inventor: Richard G. Moe, La Porte, Ind.

[73] Assignee: Allis-Chalmers Corporation, Milwaukee, Wis.

[21] Appl. No.: 648,318

[22] Filed: Jan. 12, 1976

[51] Int. Cl.² ........................ A01B 15/10; A01B 13/12
[52] U.S. Cl. ..................................... 172/708; 172/742; 172/735; 172/667
[58] Field of Search ............... 172/707, 708, 709, 710, 172/711, 736, 742, 735, 264, 265, 266, 267, 268, 705, 706, 667

[56] References Cited

U.S. PATENT DOCUMENTS

| Re. 8,926 | 10/1879 | Dodge | 172/742 X |
| 1,876,865 | 9/1932 | Dean | 172/708 |

*Primary Examiner*—George J. Marlo
*Attorney, Agent, or Firm*—Charles L. Schwab

[57] ABSTRACT

A plow bottom is pivotally connected to the stub beam on a substantially vertical axis and yieldable biasing devices are provided which permit the moldboard to pivot about the axis as plowing speed is increased. Both mechanical and fluid biasing devices are disclosed together with an additional embodiment wherein a hydraulic actuator under the control of the operator is used to pivotally adjust the plow bottom.

9 Claims, 6 Drawing Figures

ADJUSTABLE MOLDBOARD FOR VARIABLE SPEED PLOWING

BACKGROUND OF THE INVENTION

A plow manufactured by Dietrich Mfg., Inc. of Goodfield, Illinois pivotally connects a plurality of plow shanks to the main frame of a plow on vertical axes and a tie rod interconnects the plow shanks for changing the angular position of the plow bottoms. A hydraulic actuator is connected to the tie rod mechanism to horizontally pivot all of the plow bottoms simultaneously relative to the main frame. U.S. Pat. No. 2,326,097 shows a three-bottom plow wherein the rear part of each moldboard is pivoted. The pivoted moldboard parts are interconnected by a tie rod mechanism and are adjustably pivoted by the tractor operator through a linkage mechanism including a cable. U.S. Pat. No. 247,110 shows a plow having the rear part of its moldboard pivotally adjustable relative to its front part. U.S. Pat. Nos. 2,217,888 and 3,199,610 show plows with moldboard sections which are movable against the action of spring biasing means. U.S. Pat. Nos. 26,111 and 185,383 each show a walk-behind plow with means for adjusting the plow bottom on a substantially vertical axis relative to the draft beam.

BRIEF DESCRIPTION OF THE INVENTION

The plow bottom is pivotally connected near its forward end to the bottom front part of the stub beam by which the plow bottom is connected to the main frame of the plow. Means are provided to releaseably hold the plow bottom in a normal straight-ahead position in relation to the stub beam. In two versions of this invention, this means comprises mechanical springs which resiliently oppose horizontal swinging of the plow bottom about the vertical pivot axis by which the plow bottom is connected to the stub beam. As plowing speed is increased, the force of the land against the moldboard side of the plow bottom will pivot it against the biasing action of the spring means and thus result in the plowed land being thrown sideways a lesser distance than would otherwise be the case. This is a desirable feature of the present invention inasmuch as in using a fixed plow for high speed plowing, there is a tendency for the plow to throw the material an excessive distance, and if adjusted so as to not throw it an excessive distance, the plow will not cover the field trash when plowing at slow speed as, for instance, when the tractor is slowed at the end of the field preparatory to turning. In one embodiment of the invention, yieldable biasing means in the form of a hydraulic cylinder connected to a gas-hydraulic accumulator is provided to permit automatic pivoting of the plow bottom during high speed plowing. Another embodiment of the invention illustrates the use of a hydraulic actuator which may be controlled by the operator to selectively pivot the plow bottom to the ideal position for the selected plowing speed and soil conditions.

DETAILED DESCRIPTION OF THE INVENTION

Figure 1:
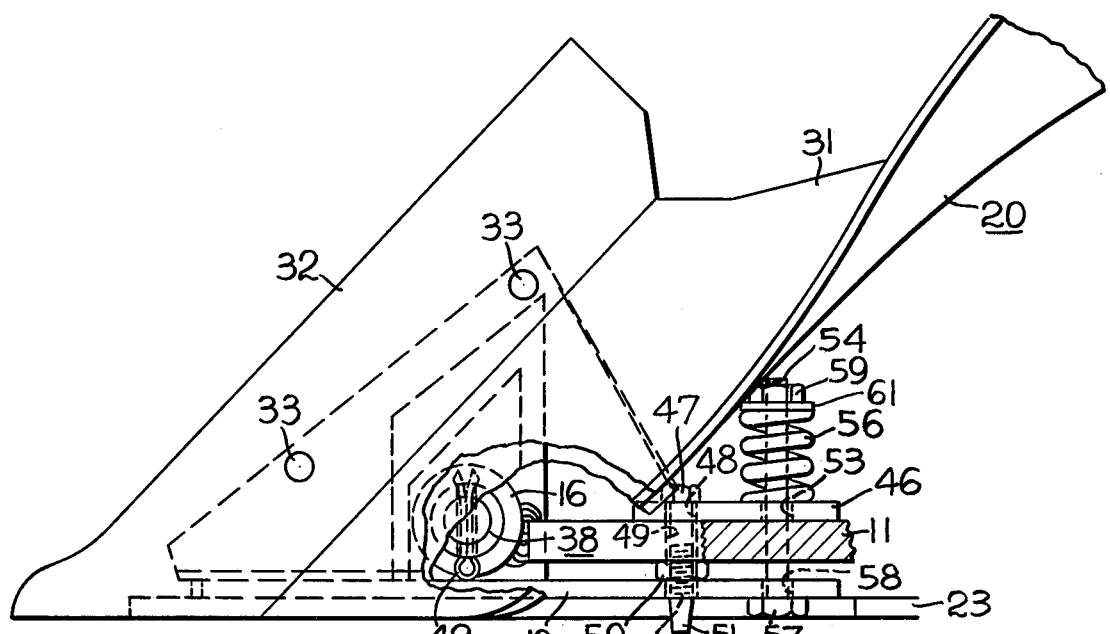
FIG. 1 is a top view of a plow bottom mounted on a stub beam in accordance with one embodiment of the present invention.
Figure 2:
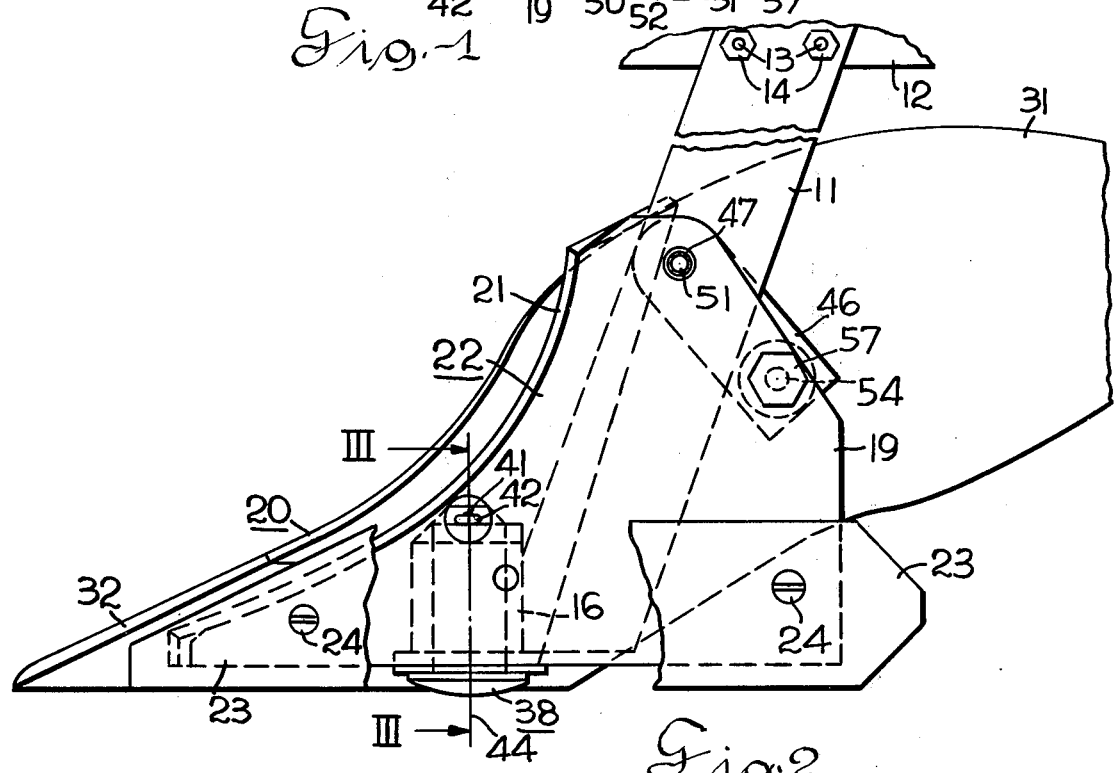
FIG. 2 is a side view of the plow shown in FIG. 1.
Figure 3:
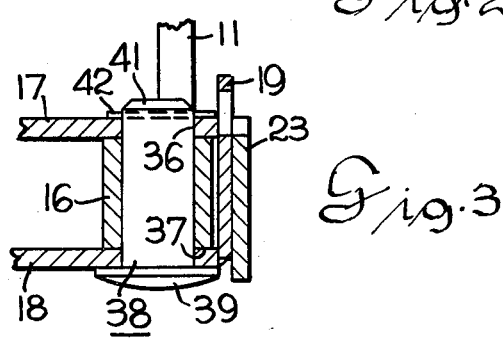
FIG. 3 is a sectional view taken along the line III—III in FIG. 2.

Referring to FIGS. 1, 2 and 3 showing a first embodiment of the present invention, a stub beam 11 is secured to the main frame 12 of a moldboard plow by releasable fastening means including bolts 13 and nuts 14. The stub beam 11 depends downwardly and forwardly, terminating in a nose portion to which a cylindrical bushing 16 is welded. The bushing 16 is disposed vertically between a pair of horizontal plates 17, 18 of the plow bottom 20 and the plates have their laterally opposite ends welded to a vertical sidewall 19 and a sloping sidewall 21 of a frog 22. The vertical sidewall 19 of the frog 22 is in juxtaposed relation to the stub beam 11 and a land side plate 23 is releasably secured thereto by screws 24. The sloping sidewall 21 is curved and slopes downwardly and outwardly from the vertical land sidewall 19. A moldboard 31 is secured to the sloping sidewall 21 by means not shown, and a removable plowshare 32 is secured to the wall 21 by plowshare bolts 33 and nuts, not shown. The horizontally disposed and vertically spaced plates 17 and 18 present a pair of aligned bores 36, 37 which receive a pivot pin 38. The pivot pin 38 includes a head 39 on its bottom end and a transverse bore 41 at its upper end in which a resilient split pin 42 is disposed. Thus, the bushing 16, the pin 38 and the plates 17, 18 comprise a pivot structure for mounting the plow bottom 20 on the stub beam 11 for horizontal pivotal movement about a substantially vertical pivot axis 44.

A mounting strap 46 is secured to the stub beam 11 by a nut 50 and a bolt 47, which extends through openings 48, 49. The bolt 47 has a tapered pilot end 51 which extends through an opening 52 in the vertical wall 19 of the frog 22. The plate 46 has an opening 53, spaced rearwardly from the opening 48 in the strap 46, which receives a spring mounting bolt 54 extending through a resilient biasing member in the form of a coil spring 56. The head 57 of the bolt 54 bears against the vertical sidewall 19 of the frog 22 and the bolt 54 extends through an opening 58 therein. A nut 59 and washer 61 maintain the spring 56 under a predetermined preload. The preload can be changed by adjusting the position of the nut 59 on the bolt 54.

During low-speed plowing, the plow bottom pivotally connected to the stub beam 11 will assume the position illustrated in FIGS. 1 and 2 wherein the land side plate 23 of the plow is aligned in the longitudinal direction of movement of the tractor pulling the plow. If the tractor speed is increased substantially, the additional force of the ground against the share 32 and moldboard 31 will create a sufficient moment in a clockwise direction, as viewed in FIG. 1, to cause the spring 56 to be compressed, and the bottom 20 will pivot clockwise, as viewed in FIG. 1, to a new position. In the new position, the plowed ground will not be thrown as far sidewise by the moldboard, thus ensuring a proper disposition of the plowed ground.

Figure 4:
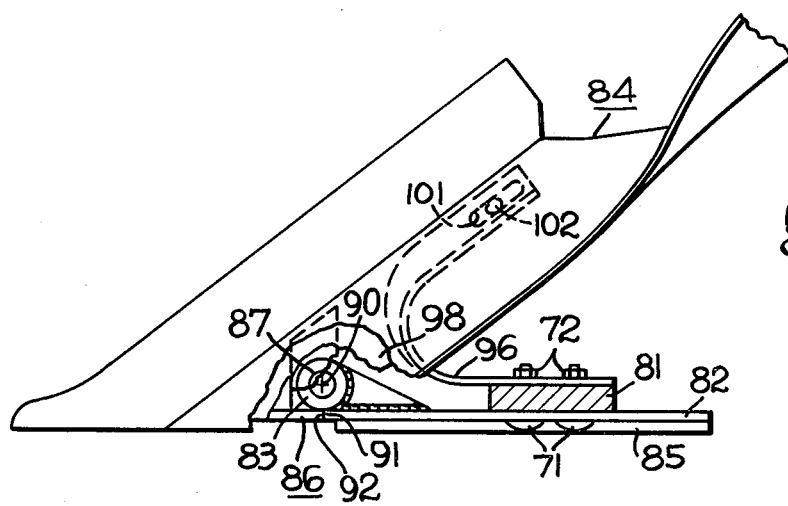
FIG. 4 is a top view of a plow incorporating a second embodiment of the present invention.

Referring to FIG. 4, a second embodiment of the present invention is illustrated wherein a land side support member 82 is rigidly secured to a stub beam 81. A pivot bushing 83 is welded to the front part of support member 82 and a land side plate 85 is releasably secured to the support member 82 by releasable fastening means in the form of bolts and nuts not shown. The frog of the plow bottom 84 carries a pivot pin 87 which is received within the bushing 83 and completes a pivot connection between the plow bottom 84 and the stub beam 81. As illustrated, a pair of confronting abutment surfaces 91, 92 on the plow bottom 84 and support member 82 are in abutting engagement to limit counterclockwise pivotal movement of the plow bottom 84 relative to the beam 81 about the substantially vertical pivot axis 90 between the plow bottom and the stub beam 81. A curved leaf spring 96 is secured to the support member 82 by the bolts 71 and nuts 72 and curves to lie flat on the backside of the curved member 98 of the frog 86. The resilient leaf spring 96 has an elongated slot 101 which cooperatively engages a rearwardly and downwardly extending pin 102 on the curved member 98. The pivot connection and leaf spring of the embodiment shown in FIG. 4 permits the plow bottom to rotate clockwise, as viewed in FIG. 4, about the pivot axis 90 when the soil resistance against the plow bottom 84 exceeds a predetermined force thereby causing resilient deflection of the leaf spring 96. This provides automatic pivotal adjustment of the plow bottom during high speed plowing whereby the plow bottom will not throw the ground an excessive distance to one side. When the tractor slows at the end of the field to make a turn the plow bottom will return to its normal straight ahead position in which illustrated, thereby insuring proper cover of field trash at the lower speed.

Figure 5:
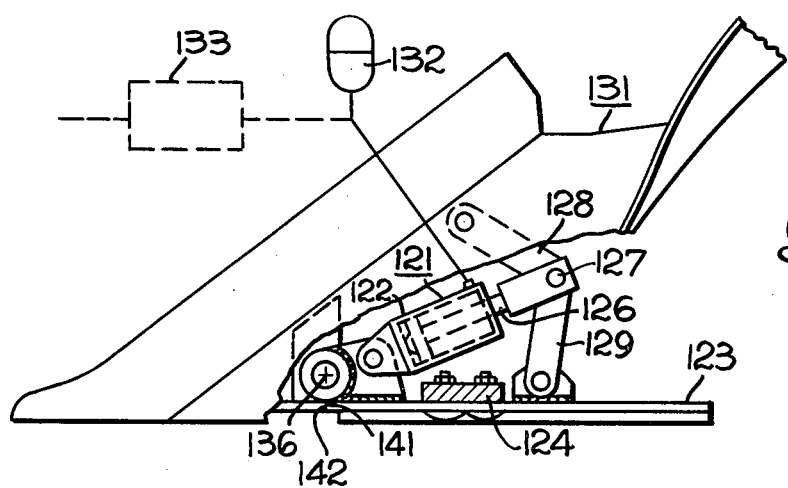
FIG. 5 is a top view of a plow embodying a third embodiment of the present invention.

Referring to FIG. 5, a third embodiment of the present invention is illustrated wherein the biasing means for the plow comprises a fluid jack 121 including a cylinder 122 having its closed end pivotally connected to the support member 123 to which the stub beam 124 of the plow is secured. The rod 126 of the jack 121 is pivotally connected to a pin 127 which pivotally interconnects a pair of links 128, 129 which in turn have their outer ends pivotally connected to the frog of the plow bottom 131 and to the support member 123. The pressure chamber of the rod end of the cylinder 122 is connected to a gas type hydraulic accumulator 132 which is charged at a predetermined pressure. If desired, the accumulator may be connected to a source of fluid pressure on the pulling tractor (not shown) by way of a manually adjustable pressure regulator 133 whereby the hydraulic fluid pressure may be set by the operator at different levels for different soil conditions and different depths of plowing.

In using the embodiment of the invention shown in FIG. 5, the fluid will be expelled from the rod end of the jack 121 when the forces against the plow bottom 131 exceed a predetermined value and the plow bottom will pivot clockwise about its pivot axis 136 on which the plow bottom 131 is pivotally connected to the support member 123. Thus, the accumulator and hydraulic jack serve as yieldable spring means to bias the plow bottom 131 toward its normal straight-ahead position in which illustrated, wherein abutment surfaces 141, 142 on the plow bottom 131 and the support member 123 are in engagement.

Figure 6:
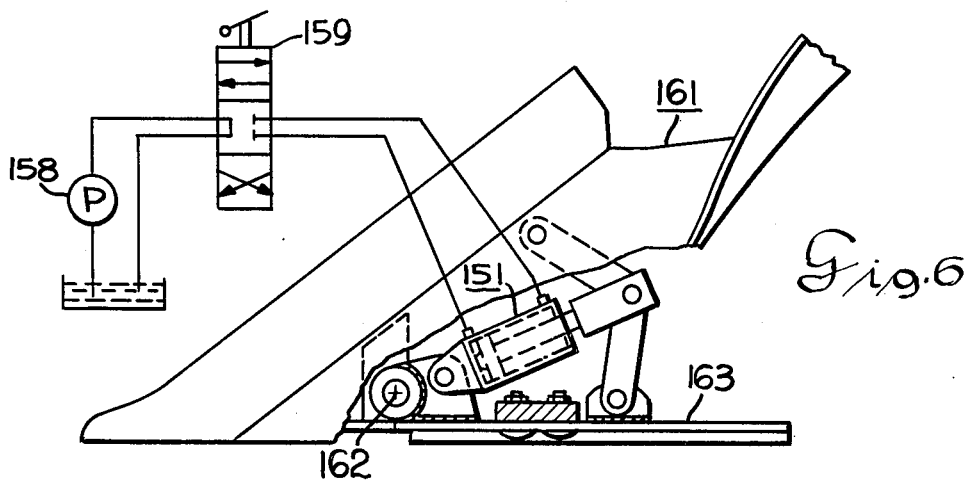
FIG. 6 is a top view of a plow incorporating a fourth embodiment of the present invention.

Referring to FIG. 6, a fourth embodiment of the invention is illustrated which is similar in configuration to that shown in FIG. 5 except that the fluid jack has been replaced by a double-acting hydraulic jack 151.

The jack 151 is connected to a source of fluid pressure, including a gear pump 158, by way of a manually operated control valve 159 having jack expand, hold and jack contract positions of adjustment. This manually operated control valve 159 is located on the tractor to which the plow is connected. This embodiment of the invention may be useful in fields having widely varying soil conditions; that is, one part of a field may have gumbo type soil and another part of the field may have a light-weight or sandy soil. Thus, at high speed, the sandy soil may not offer sufficient resistance to pivot the plow bottoms of the previously described embodiments. However, the operator may adjust the angle of the plow to prevent it from throwing the soil too far to one side by expanding the jack 151 thus causing the plow bottom 161 to be rotated in a clockwise direction, as viewed in FIG. 6, about the pivot axis 162 on which the plow bottom 161 is pivotally connected to the support 163.

The embodiments of the invention in which an exclusive property or privilege is claimed are defined as follows:

1. A self-adjusting moldboard plow for variable speed plowing comprising:
   a frame including a downwardly depending stub beam,
   a plow bottom including a frog,
   a pivot structure pivotally connecting the bottom front of said stub beam to said frog for horizontal pivotal movement of said plow bottom relative to said stub beam,
   cooperating abutments on said plow bottom and stub beam limiting pivotal movement of said plow beam in one direction, said abutments normally being in engagement, and
   biasing means operatively interposed between said plow bottom and said stub beam urging said plow bottom in said one direction, said plow bottom automatically pivoting against the action of said biasing means in a direction opposite to said one direction when said plow bottom encounters predetermined soil resistance during plowing.

2. The plow of claim 1 wherein said biasing means includes a fluid actuator.

3. The plow of claim 2 wherein said biasing means includes a source of selectively variable pressure fluid connected to said actuator.

4. The plow of claim 1 wherein said biasing means includes a coil spring.

5. The plow of claim 1 wherein said biasing means includes a leaf spring.

6. The plow of claim 1 wherein said pivot structure includes a pivot pin having a substantially vertical axis.

7. The plow of claim 6 wherein said pivot structure further includes a bushing pivotally engaging said pin, said bushing being disposed at the lower front of said stub beam and being rigidly secured thereto.

8. The plow of claim 1 wherein said frog includes a substantially vertical land sidewall and a curved moldboard attaching wall and wherein said plow bottom includes a share and a moldboard secured to said moldboard attaching wall and a substantially vertical and longitudinally disposed land side plate secured to said land sidewall.

9. The plow of claim 1 wherein said plow bottom includes a land side plate rigidly secured to said stub beam.

* * * * *